United States Patent
Blümel et al.

(10) Patent No.: US 9,073,502 B2
(45) Date of Patent: Jul. 7, 2015

(54) CRASH BOX FOR A BUMPER ASSEMBLY

(71) Applicants: Michael Blümel, Flatz (AT); Christian Hengst, Vienna (AT)

(72) Inventors: Michael Blümel, Flatz (AT); Christian Hengst, Vienna (AT)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 14/370,117

(22) PCT Filed: Feb. 3, 2013

(86) PCT No.: PCT/IB2013/000584
§ 371 (c)(1),
(2) Date: Jul. 1, 2014

(87) PCT Pub. No.: WO2013/114213
PCT Pub. Date: Aug. 8, 2013

(65) Prior Publication Data
US 2014/0367984 A1    Dec. 18, 2014

Related U.S. Application Data

(60) Provisional application No. 61/594,656, filed on Feb. 3, 2012.

(51) Int. Cl.
*B60R 19/34* (2006.01)
*B60R 19/18* (2006.01)
*B21C 23/00* (2006.01)

(52) U.S. Cl.
CPC .......... *B60R 19/18* (2013.01); *Y10T 29/49622* (2015.01); *B60R 19/34* (2013.01); *B21C 23/00* (2013.01)

(58) Field of Classification Search
CPC ................................. B60R 19/26; B60R 19/34
USPC .......................................... 293/132, 133, 155
See application file for complete search history.

(56) References Cited

U.S. PATENT DOCUMENTS

| | | | | |
|---|---|---|---|---|
| 5,462,144 A * | 10/1995 | Guardiola et al. | ............ | 188/377 |
| 6,338,510 B1 * | 1/2002 | Kanamori et al. | ............ | 293/154 |
| 6,371,541 B1 * | 4/2002 | Pedersen | ........................ | 293/132 |
| 6,502,874 B2 * | 1/2003 | Kajiwara et al. | ............... | 293/133 |
| 6,988,753 B1 * | 1/2006 | Omura et al. | .................... | 293/13 |
| 7,080,862 B2 * | 7/2006 | Suzuki et al. | ................. | 293/154 |

(Continued)

FOREIGN PATENT DOCUMENTS

| | | |
|---|---|---|
| CA | 2577993 A1 | 3/2006 |
| DE | 102008020051 A1 | 10/2008 |
| KR | 20090070809 A | 7/2009 |

OTHER PUBLICATIONS

English translation of DE 10 2008 020051 A1 generated by computer.*

*Primary Examiner* — Gregory Blankenship
(74) *Attorney, Agent, or Firm* — Dickinson Wright PLLC

(57) ABSTRACT

A crash box includes a body portion extending from a top edge to a bottom edge along a global z-axis (A) and having a pair of side walls disposed in spaced relationship to one another. At least one x-shaped reinforcing web extends between the side walls along a plane (P) disposed transverse to the axis (A). An extension portion is integral with the body portion and extends outwardly from one of the side walls and is disposed along the plane (P). A flange plate is also integral with the body portion and defines at least one flange plate attachment hole for securing the crash box to a frame of a vehicle.

11 Claims, 4 Drawing Sheets

(56) References Cited

U.S. PATENT DOCUMENTS

| | | | |
|---|---|---|---|
| 7,300,080 B2 * | 11/2007 | Rebuffet et al. | 293/120 |
| 7,401,825 B2 * | 7/2008 | Frank et al. | 293/155 |
| 8,246,092 B2 * | 8/2012 | Frank | 293/155 |
| 8,353,545 B1 * | 1/2013 | Baldwin | 293/133 |
| 8,454,064 B2 * | 6/2013 | Frank | 293/155 |
| 8,632,108 B2 * | 1/2014 | Matuschek et al. | 293/133 |
| 2005/0104393 A1 * | 5/2005 | Haneda et al. | 293/133 |
| 2006/0043744 A1 * | 3/2006 | Iketo et al. | 293/132 |
| 2011/0012381 A1 * | 1/2011 | Saito et al. | 293/133 |
| 2011/0193370 A1 * | 8/2011 | Klimek | 296/187.09 |
| 2012/0104778 A1 * | 5/2012 | Mana et al. | 293/133 |
| 2012/0139273 A1 * | 6/2012 | Jeong et al. | 293/132 |
| 2014/0203578 A1 * | 7/2014 | Kaneko et al. | 293/133 |
| 2014/0292007 A1 * | 10/2014 | Kawamata et al. | 293/133 |
| 2014/0367984 A1 * | 12/2014 | Blumel et al. | 293/132 |

* cited by examiner

CRASH BOX FOR A BUMPER ASSEMBLY

CROSS REFERENCE TO RELATED APPLICATIONS

This U.S. National Stage Patent Application claims the benefit of International Application serial number PCT/IB2013/000584 filed Feb. 3, 2013, entitled "Crash Box For A Bumper Assembly" which claims priority to U.S. provisional application Ser. No. 61/594,656 filed Feb. 3, 2012, the entire disclosure disclosures of the applications being considered part of the disclosure of this application, and hereby incorporated by reference.

BACKGROUND OF THE INVENTION

1. Field of the Invention

The present invention relates to a crash box for use with a bumper beam. The subject invention is also related to a method of manufacturing the crash box.

2. Description of the Prior Art

Vehicle bumper assemblies are known for providing energy absorbing characteristics. Body structures of a vehicle are provided with so-called crash boxes. Such crash boxes are disposed on the end of a frame member of a vehicle body structure so as to absorb an impact load of certain predetermined value, thereby eliminating deformation of the frame member of the vehicle body.

Bumper assemblies include a bumper beam typically extending laterally across the front or rear of a vehicle and provided generally for absorbing energy during a frontal or rear impact. Such bumper beams are disposed under a cosmetic or fascia bumper and are mounted to a vehicle frame with use of the so-called crash boxes referred to above. The crash-boxes are designed to fold upon such frontal or rear impacts.

The crash boxes are mounted to the vehicle frame and the bumper beam by many different means including, without limitation, welding, adhesives, fasteners, etc. Such crash boxes and bumper beams can be made of many different types of materials including, without limitation, steel, aluminum, and/or magnesium.

There remains a significant and continuing need for a crash box that allows for lower manufacturing and assembling costs along with improved energy absorption properties. There also remains a significant and continuing need for an improved method of manufacturing a crash box which reduces manufacturing costs and results in a crash box having improved energy absorption properties.

SUMMARY OF THE INVENTION

The subject invention includes a body portion extending from a top edge to a bottom edge along a global z-axis A, the body portion having a pair of side walls extending between mounting ends and collision ends in spaced relationship relative to one another. The crash box includes at least one x-shaped reinforcing web extending between said side walls along a plane P disposed transverse to said axis A.

The subject invention also includes a method of manufacturing a crash box which includes extruding a body portion along a global z-axis A. More specifically, the method begins with the step of extruding a body portion along the global z-axis A between a top edge and a bottom edge to form a pair of side walls disposed in spaced relationship to one another and at least one x-shaped reinforcement web extending between the side walls along a plane P disposed transverse to the global z-axis A.

DETAILED DESCRIPTION OF THE ENABLING EMBODIMENTS

Figure 1:
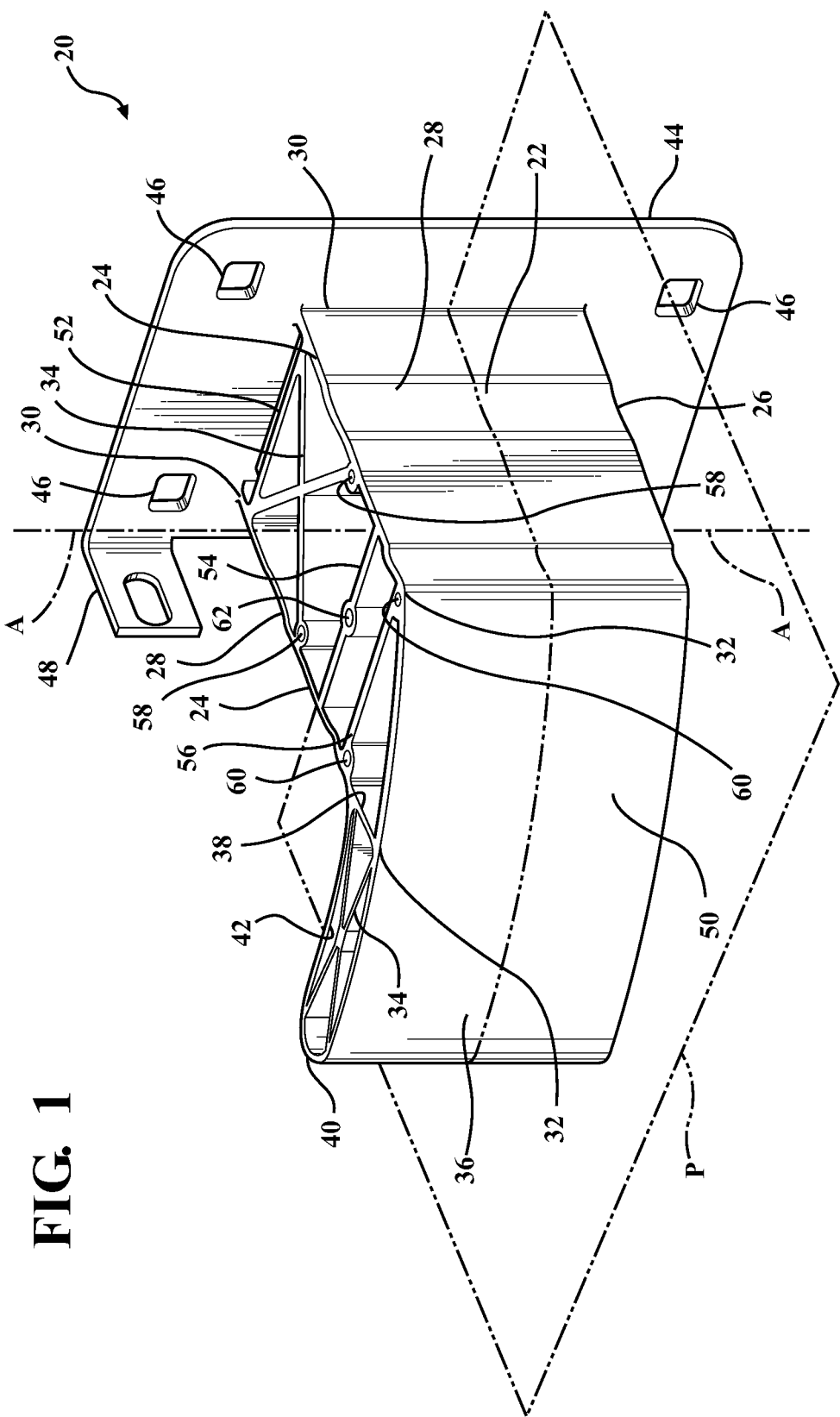
FIG. 1 is a perspective view of a crash box illustrating a body portion extending along a global z-axis A, an x-shaped reinforcing web extending along a plane P disposed transverse to the axis A, an extension portion extending outwardly from the body portion along the plane P, and a flange plate integral with the body portion.
Figure 2:
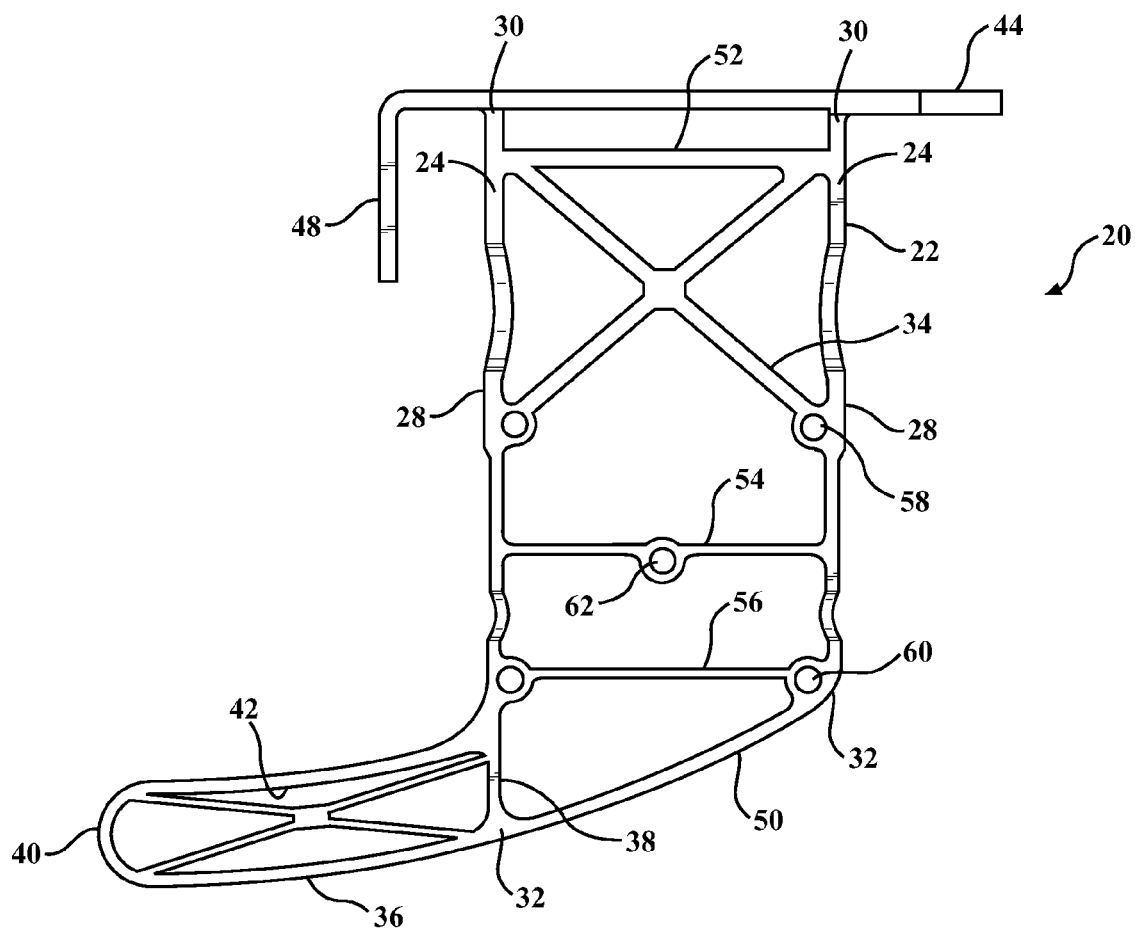
FIG. 2 is a top view of the crash box.
Figure 3:
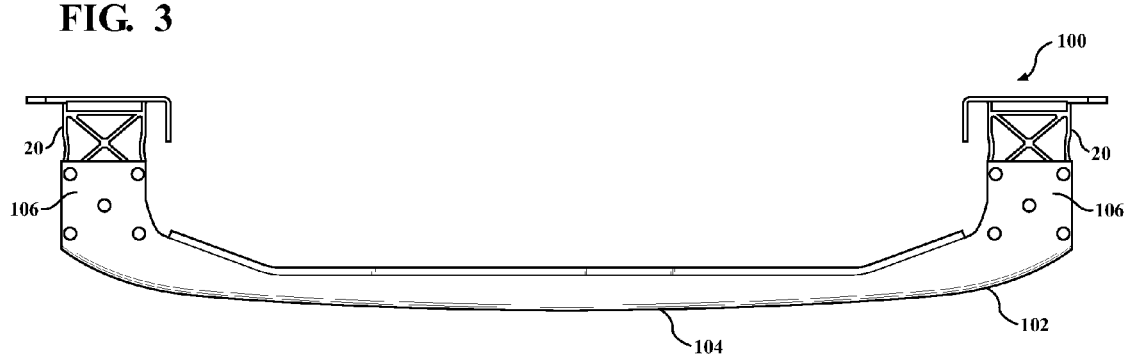
FIG. 3 is a top view of the crash box mated with a bumper beam and illustrating the body portion of the crash box overlaid with a top cover plate of the bumper beam.
Figure 4:
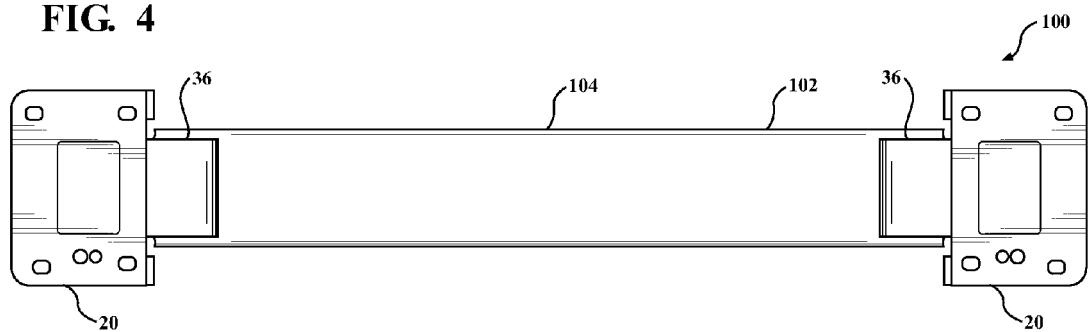
FIG. 4 is a rear view of the crash box mated with the bumper beam.
Figure 5:
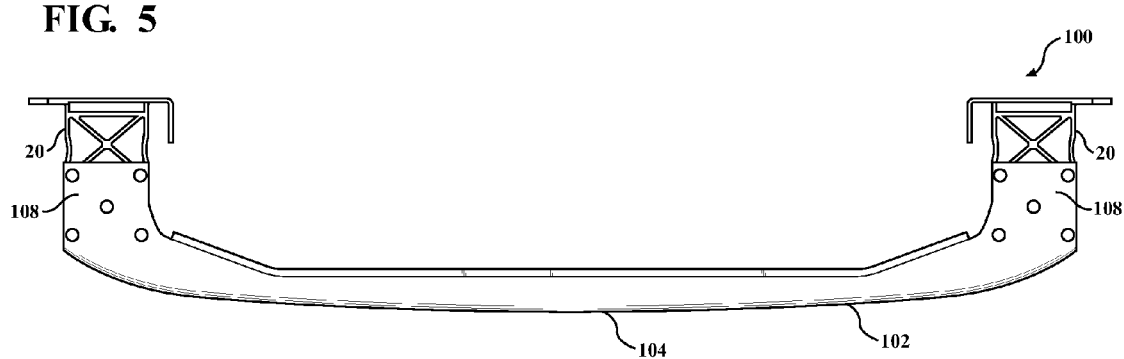
FIG. 5 is a front view of the crash box mated with the bumper beam.
Figure 6:
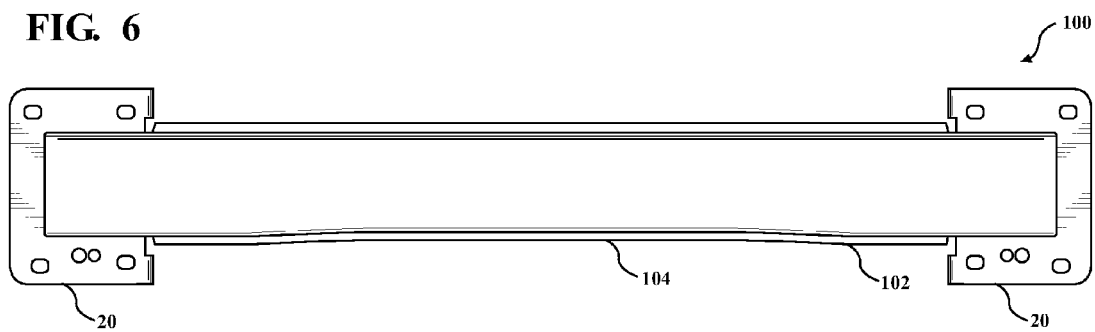
FIG. 6 is a bottom view of the crash box mated with the bumper beam and illustrating the body portion of the crash box underlaid with a bottom cover plate of the bumper beam.

Referring to the Figures, wherein like numerals indicate corresponding parts throughout the several views, a crash box 20 for mating with a bumper beam is generally shown in FIGS. 1 and 2. The crash box 20 includes a body portion 22 extending from a top edge 24 to a bottom edge 26 along a global z-axis A. The body portion 22 has a pair of side walls 28 extending between mounting ends 30 and collision ends 32 in spaced relationship relative to one another and the global z-axis A. An x-shaped reinforcing web 34 extends between the side walls 28 along a plane P that is disposed transverse to the axis A. The addition of the x-shaped reinforcing web 34 to the body portion 24 improves the crash performance of the crash box 20. Although FIGS. 1 and 2 only illustrate one x-shaped reinforcing web 34 extending between the side walls 28, additional x-shaped reinforcing webs 34 can also extend between the side walls 28 of the body portion 22. It should also be appreciated that the x-shaped reinforcing web 34 could be any number of shapes depending on the design criteria selected including, without limitation, the amount of structural support desired, the weight of the crash box or the bumper assembly, and/or the amount of desired crush of the crash box.

As best shown in FIGS. 1 and 2, the crash box 20 includes an extension portion 36 which is integral with the body portion 22 and extends outwardly from next adjacent the collision end 32 of one of the side walls 28. The extension portion 36 is also disposed along the plane P and extends between a first extension end 38 to a second extension end 40 to define an extension cavity 42 extending therebetween. The extension portion 36 also improves the performance of a bumper assembly 100, as generally shown in FIGS. 3-6, when the crash box 20 having the extension portion 36 is mated with a bumper beam 102. For example, the extension portion 36 of the crash box 20 improves the crash performance of the resultant bumper assembly 100 in both the Research Council for Automobile Repairs (RCAR) and Insurance Institute for Highway Safety (IIHS) standardized crash tests. This can best be explained because the crash box 20 receives earlier contact with an RCAR barrier as a result of the extension portion 36, and thus leads to earlier absorption of energy and less intrusion of the RCAR barrier in the RCAR standardized crash test.

Since the crash box 20 including the extension portion 36 improves crash performance, the extension portion 36 can also allow for a thickness reduction of the bumper beam 102 to which the crash box 20 is mated. Put another way, if the crash box 20 including the extension portion 36 is absorbing more energy during the RCAR standardized test, then it is possible to have a less stiffer bumper beam 102 which provides an opportunity to reduce wall thickness, and thus weight, of the bumper beam 102 to which the crash box 20 is paired. Additionally, since the extension portion 36 is integral with the body portion 22, an additional part or process is not required to add the extension portion 36 to the crash box 20. Further, since an additional part or manufacturing process can be eliminated, this necessarily results in additional weight being removed from the crash box 20. For the above reasons, the extension portion 36 is advantageous because it can provides for an overall weight reduction for the resultant bumper assembly 100.

The extension portion 36 of the crash box 20 also allows for a hybrid system of the bumper beam 102 and crash box 20. Put another way, the extension portion 36 of the crash box 20 allows non-identical materials to be used to manufacture the bumper assembly 100. In the preferred embodiment, the hybrid system of the bumper assembly 100 includes the crash box 20 made of aluminum and the bumper beam 102 made of steel. However, it should be appreciated that other hybrid systems could also be used to manufacture the bumper assembly 100.

As best shown in FIG. 2, the extension cavity 42 is open between the first extension end 38 and the second extension end 40. Said another way, the extension cavity 42 does not close or cease prior to reaching the second extension end 40 of the extension portion 36. Further, although not expressly illustrated in the Figures, the extension portion can include an extension reinforcing web (not expressly shown) that is disposed within the extension cavity 42 to improve crash performance of the crash box 20. In the preferred embodiment, the extension reinforcing web has an x-shaped configuration. However, it should also be appreciated that the x-shaped extension reinforcing web could be any number of shapes depending on the design criteria selected including, without limitation, the amount of structural support desired, the weight of the crash box or the bumper beam, and/or the amount of desired crush of the crash box.

As best shown in FIG. 1, the crash box 20 includes a flange plate 44 which is integral with the body portion 22 and interconnects the mounting ends 30 of the side walls 28. As best shown in FIG. 1, the flange plate 44 defines at least one flange plate attachment hole 46 for use in securing the crash box 20 to a frame of a vehicle with a fastener such as a bolt, screw, or the like. The prior art bumper assemblies require a separate flange plate to interconnect the crash box to the frame of a vehicle. However, since the flange plate 44 is integral with the body portion 22, an additional part is not required to couple crash box 20 to the frame of a vehicle. Thus, the integral flange plate 44 eliminates a part from the manufacturing process and thus reduces manufacturing costs for the bumper assembly 100. In an embodiment, the flange plate 44 can additionally include an l-shaped bracket 48 for providing an additional location to secure the crash box 20 to the frame of the vehicle.

As best shown in FIG. 2, the extension cavity 42 is open between the first extension end 38 and the second extension end 40. Said another way, the extension cavity 42 does not close or cease prior to reaching the second extension end 40 of the extension portion 36. Further, as best shown in FIGS. 1 and 2, the extension portion 36 can include an extension reinforcing web 34 that is disposed within the extension cavity 42 to improve crash performance of the crash box 20. In the preferred embodiment, the extension reinforcing web 34 has an x-shaped configuration. However, it should also be appreciated that the x-shaped extension reinforcing web 34 could be any number of shapes depending on the design criteria selected including, without limitation, the amount of structural support desired, the weight of the crash box or the bumper beam, and/or the amount of desired crush of the crash box.

As best shown in FIGS. 3-6, the bumper beam 102 to which the crash box 20 is mated to form the bumper assembly 100 includes a cross member 104 as well as a top closing plate 106 and a bottom closing plate 108 each extending outwardly from the cross member 104 in spaced and mirrored relationship. When the crash box 20 is mated with the bumper beam 102, the top edge 24 of the body portion 20 underlays the top closing plate 106 of the bumper beam 102 and the bottom edge 26 of the body portion 22 overlays the bottom closing plate 108 of the bumper beam 102. Each of the side walls 28 are then secured to the respective closing plate 106, 108, using glue, screws, bolts, or the like, to enclose the body portion 22 of the crash box 20.

In the preferred embodiment, the top and bottom cover plates 106, 108 of the bumper beam 102 are mechanically secured to the crash box 20. Thus, as best shown in FIG. 2, each of the side walls 28 define at least one fastening bore 58, 60 extending from the top edge 24 to the bottom edge 26 for receiving a mechanical fastener to establish the secured mechanical relationship with the respective closing plates 106, 108. In the preferred embodiment, the side walls 28 define a first fastening bore 58 at the intersection of the side walls 28 and the side of the x-shaped reinforcement web 34 that is disposed opposite to the first linear reinforcement web 52. The side walls 28 also define a second fastening bore 60 at the intersection of the side walls 28 and the third linear web reinforcement 56. In the preferred embodiment, the second linear web reinforcement 54 can also define a third fastening bore 62 which is disposed equidistantly between the side walls 28.

A method of manufacturing a crash box 20 includes extruding a body portion 22 along a global z-axis A between a top edge 24 and a bottom edge 26 to form a pair of side walls 28 which are disposed in spaced relationship to one another and at least one x-shaped reinforcement web 34 which extends between the side walls 28 along a plane P disposed transverse to the global z-axis A. The extrusion of the body portion 22 can also include forming at least one linear reinforcing web 52, 54, 56 which extends linearly between the side walls.

The method of manufacturing the crash box 20 additionally includes integrally extruding an extension portion 36 with the body portion 22. The integrally extruded extension portion 36 extends outwardly from the body portion 22 along the plane P and defines an extension cavity 42. The integral extrusion of the extension portion 36 eliminates the additional manufacturing steps which are required when an extension portion is separated added to the crash box. Thus, the integral extrusion of the extension portion 36 thus reduces manufacturing time and costs. In the preferred embodiment, the integral extrusion of the extension portion 36 also includes forming at least one x-shaped reinforcing web 34 within the extension cavity 42. However, it should also be appreciated that the x-shaped extension reinforcing web could be any number of shapes depending on the design criteria selected including, without limitation, the amount of structural support desired, the weight of the crash box or the bumper assembly, and/or the amount of desired crush of the crash box.

The method of manufacturing the crash box 20 also includes integrally extruding a flange plate 44 with the body portion 22 which interconnects the sides walls 28 and includes at least one flange plate attachment hole 48 to secure the crash box 20 to a frame of a vehicle. The integral extrusion of the flange plate 44 with the body portion 22 provides for one extrusion profile of the crash box 20. Put another way, the integral extrusion of the flange plate 44 allows for the flange plate 44 and the crash box 20 to be combined into one part. Thus, the integral extrusion of the flange plate 44 eliminates the separate part which is currently required to secure a crash box to the frame of a vehicle, and thus reduces the manufacturing costs for the bumper assembly 100.

The method of manufacturing the crash box 20 also includes providing a bumper beam 102 having a cross member 104 and a top closing plate 106 and a bottom closing plate 108 each extending outwardly from the cross member 104 in spaced and mirrored relationship. The method then proceeds by overlaying the bottom edge 26 of the body portion 22 along the bottom closing plate 108 and underlaying the top edge 24 of the body portion 22 along the top closing plate 106, and then securing the side walls 28 to the respective closing plates 106, 108 to enclose the body portion 22 of the crash box 20. The prior art bumper assemblies require an extrusion of the crash box in a global x-direction to obtain a crash box which is enclosed along the top and bottom edges. However, the enclosure of the crash box 20 with closing plates 106, 108 which extend outwardly from the bumper beam 102 facilitates an extrusion of the crash box 20 in the global z-direction. As discussed above, the extrusion of the crash box 20 in the global z-direction allows for an integral extrusion of both the flange plate 44 and the extension portion 36 with the crash box 20, and thus reduces manufacturing costs by eliminating parts and/or manufacturing processes.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A crash box for mating with a bumper beam comprising:
a body portion extending from a top edge to a bottom edge along a global z-axis A;
said body portion having a pair of side walls extending between mounting ends and collision ends in spaced relationship relative to one another;
at least one x-shaped reinforcing web extending between said side walls along a plane P disposed transverse to said axis A;
an extension portion integral with said body portion and extending outwardly from next adjacent said collision end of one of said side walls and disposed along said plane P between a first extension end to a second extension end to define an extension cavity extending therebetween; and
said extension portion including at least one extension reinforcing web disposed within said cavity.

2. The crash box as set forth in claim 1 further comprising a flange plate integral with said body portion and interconnecting said mounting ends of said side walls.

3. The crash box as set forth in claim 2 wherein said flange plate defines at least one flange plate attachment hole for securing the crash box to a frame of a vehicle.

4. The crash box as set forth in claim 1 further comprising at least one linear reinforcing web extending linearly between said side walls along the plane P.

5. A crash box for mating with a bumper beam comprising:
a body portion extending from a top edge to a bottom edge along a global z-axis A;
said body portion having a pair of side walls extending between mounting ends and collision ends in spaced relationship relative to one another;
at least one x-shaped reinforcing web extending between said side walls along a plane P disposed transverse to said axis A;
an extension portion integral with said body portion and extending outwardly from next adjacent said collision end of one of said side walls and disposed along said plane P between a first extension end to a second extension end to define an extension cavity extending therebetween; and
said body portion having a collision wall extending between said mounting ends of said side walls and aligned with said extension portion for absorbing an impact from the bumper beam.

6. A crash box for mating with a bumper beam comprising:
a body portion extending from a top edge to a bottom edge along a global z-axis A;
said body portion having a pair of side walls extending between mounting ends and collision ends in spaced relationship relative to one another;
at least one x-shaped reinforcing web extending between said side walls along a plane P disposed transverse to said axis A;
said bumper beam including a cross member and a top closing plate and a bottom closing plate each extending outwardly from the cross member in spaced and mirrored relationship, and
said top edge of said body portion underlaying the top closing plate of the bumper beam and said bottom edge of said body portion overlaying the bottom closing plate of the bumper beam and each of said side walls secured to the respective closing plate to enclose said body portion of the crash box.

7. The crash box as set forth in claim 6 wherein each of said side walls define at least one fastening bore extending from said top edge to said bottom edge for receiving a fastener to establish the secured relationship with the respective closing plates.

8. A method of manufacturing a crash box comprising:
extruding a body portion along a global z-axis A between a top edge and a bottom edge to form a pair of side walls disposed in spaced relationship to one another and at least one x-shaped reinforcement web extending between the side walls along a plane P disposed transverse to the global z-axis A;
integrally extruding an extension portion with the body portion which extends outwardly from the body portion along the plane P and defines an extension cavity; and
wherein said integral extrusion of the extension portion includes forming at least one extension reinforcing web disposed within the extrusion cavity.

9. The method as set forth in claim 8 further comprising:
integrally extruding a flange plate with the body portion which interconnects the sides walls and includes at least one flange plate attachment hole to secure the crash box to a frame of a vehicle.

10. The method as set forth in claim 8 wherein said extruding the body portion includes forming at least one linear reinforcing web which extends between the side walls.

11. A method of manufacturing a crash box comprising:
extruding a body portion along a global z-axis A between a top edge and a bottom edge to form a pair of side walls disposed in spaced relationship to one another and at least one x-shaped reinforcement web extending between the side walls along a plane P disposed transverse to the global z-axis A;

providing a bumper beam having a cross member and a top closing plate and a bottom closing plate each extending outwardly from the cross member in spaced and mirrored relationship;

overlaying the bottom edge of the body portion along the bottom closing plate and underlaying the top edge of the body portion along the top closing plate; and securing the side walls to the respective closing plates to enclose the body portion of the crash box.

\* \* \* \* \*